United States Patent
Nachman

(10) Patent No.: US 10,210,181 B2
(45) Date of Patent: *Feb. 19, 2019

(54) SEARCHING AND ANNOTATING WITHIN IMAGES

(71) Applicant: Google LLC, Mountain View, CA (US)

(72) Inventor: George L. Nachman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/195,667

(22) Filed: Jun. 28, 2016

(65) Prior Publication Data
US 2016/0328420 A1  Nov. 10, 2016

Related U.S. Application Data

(63) Continuation of application No. 13/966,470, filed on Aug. 14, 2013, now Pat. No. 9,384,213.

(51) Int. Cl.
| G06F 17/30 | (2006.01) |
| G06F 17/22 | (2006.01) |
| G06F 17/24 | (2006.01) |

(52) U.S. Cl.
CPC .... G06F 17/30259 (2013.01); G06F 17/2235 (2013.01); G06F 17/241 (2013.01); G06F 17/30244 (2013.01); G06F 17/30247 (2013.01); G06F 17/30882 (2013.01)

(58) Field of Classification Search
None
See application file for complete search history.

(56) References Cited

U.S. PATENT DOCUMENTS

| 7,046,851 B2 | 5/2006 | Keaton et al. |
| 8,249,398 B2 | 8/2012 | Lee et al. |
| 8,254,699 B1 | 8/2012 | Zhao et al. |
| 8,280,881 B1 | 10/2012 | Zhou et al. |
| RE43,896 E | 1/2013 | Keaton et al. |
| 8,429,173 B1 | 4/2013 | Rosenberg et al. |

(Continued)

FOREIGN PATENT DOCUMENTS

| CN | 101449271 | 6/2009 |
| CN | 102402593 | 4/2012 |

OTHER PUBLICATIONS

Chinese Office Action issued in Application No. 201480056395.5, dated Jul. 18, 2017, 6 pages (English Translation).

(Continued)

*Primary Examiner* — Edward Martello
(74) *Attorney, Agent, or Firm* — Fish & Richardson P.C.

(57) ABSTRACT

Methods, systems, and apparatus, including computer programs encoded on a computer storage medium, for searching within images. In one aspect, a method includes receiving a query from a user device; receiving a query image from the user device; identifying a result image responsive to the query; determining that an object depicted in a sub-portion of the query image is similar to the result image; and in response to determining that the object depicted in the sub-portion of the query image is similar to the result image: providing annotation data to the user device that causes the user device to display an annotation with the query image, the annotation specifying the sub-portion of the query image that includes the object that is similar to the result image.

20 Claims, 5 Drawing Sheets

(56) References Cited

U.S. PATENT DOCUMENTS

| | | |
|---|---|---|
| 8,880,563 B2 | 11/2014 | Lin |
| 2011/0035406 A1 | 2/2011 | Petrou et al. |
| 2011/0082735 A1 | 4/2011 | Kannan et al. |
| 2011/0128288 A1 | 6/2011 | Petrou et al. |
| 2012/0109858 A1 | 5/2012 | Makadia et al. |
| 2012/0117051 A1 | 5/2012 | Liu et al. |
| 2012/0155774 A1 | 6/2012 | Li et al. |
| 2012/0177294 A1 | 7/2012 | Ke et al. |
| 2013/0016908 A1 | 1/2013 | Xin et al. |
| 2013/0054561 A1 | 2/2013 | Bennett |
| 2013/0060786 A1 | 3/2013 | Serrano et al. |
| 2013/0080426 A1 | 3/2013 | Chen et al. |

OTHER PUBLICATIONS

Extended and Supplementary European Search Report and Search Opinion in European Application No. 14836190.0-1871/3033699, dated Jan. 1, 2017, 9 pages.

Office Action issued in Chinese Application No. 201480056395.5, dated Nov. 18, 2016, 12 pages (with English Translation).

International Preliminary Report on Patentability and Written Opinion in International Application No. PCT/US2014/050846, dated Feb. 16, 2016, 9 pages.

International Search Report and Written Opinion in International Application No. PCT/US2014/050846, dated Nov. 28, 2014, 13 pages.

Aslam, N.; Irfanullah, I.; Loo, J.; Looms, M.; Roohullah, R., "A Semantic Query Interpreter framework by using knowledge bases for image search and retrieval," Signal Processing and Information Technology (ISSPIT), 2010 IEEE International Symposium on , vol., no., pp. 414,419, Dec. 15-18, 2010.

Premchaiswadi, et al., "Mobile Image Search for Tourist Information Using ACCC Algorithm," 2010 IEEE $21^{st}$ International Symposium on Personal Indoor and Mobile Radio Communications, 6 pages.

Gang Hua; Qi Tian, "What can visual content analysis do for text based image search?," Multimedia and Expo, 2009. ICME 2009. IEEE International Conference on, vol., no., pp. 1480,1483, Jun. 28, 2009-Jul. 3, 2009 doi: 10.1109/ICME.2009.5202783.

Grangier and Bengio, "A Discriminative Kernel-Based Model to Rank Images from Text Queries," IEEE Transaction on Pattern Analysis and Machine Intelligence, 30(8), Aug. 2008, pp. 1371-1384.

Salih, N.D.; Ngo, D.C.L., "An Efficient Boundary-Based Approach for Shape Representation," Information and Communication Technologies, 2006. ICTTA '06. 2nd, vol. 1, no., pp. 1504,1509.

Wang et al., "AnnoSearch: Image Auto-Annotation by Search," Proceedings of 2006 IEEE Computer Society Conf Computer Vision Pattern Recognition (CVPR '06), 2006, 2:1483-1490.

Notice of Allowance issued in Application No. 201480056395.5, dated Jan. 23, 2018, 2 pages.

Office Action issued in European Application No. 14836190.0, dated Apr. 3, 2018, 7 pages.

SEARCHING AND ANNOTATING WITHIN IMAGES

CROSS-REFERENCE TO RELATED APPLICATION

This Application is a continuation of U.S. application Ser. No. 13/966,470, titled "SEARCHING AND ANNOTATING WITHIN IMAGES" filed Aug. 14, 2013, the disclosure of which is incorporated herein by reference in its entirety.

BACKGROUND

This specification relates to searching within images.

Feature detection algorithms enable computing devices to identify visual features depicted in an image. Detection of visual features has led to developments in technology for identifying portions of images that include particular features. For example, optical character recognition techniques allow an image to be processed to identify alpha-numeric characters included in the image.

SUMMARY

This specification describes technologies relating to searching within images.

In general, one innovative aspect of the subject matter described in this specification can be embodied in methods that include the actions of receiving a query from a user device; receiving a query image from the user device; identifying a result image responsive to the query; determining that an object depicted in a sub-portion of the query image is similar to the result image; and in response to determining that the object depicted in the sub-portion of the query image is similar to the result image: providing annotation data to the user device that causes the user device to display an annotation with the query image, the annotation specifying the sub-portion of the query image that includes the object that is similar to the result image. Other embodiments of this aspect include corresponding systems, apparatus, and computer programs, configured to perform the actions of the methods, encoded on computer storage devices.

These and other embodiments can each optionally include one or more of the following features. Identifying a result image responsive to the query may comprise: identifying a plurality of image search results responsive to the query, wherein each image search result references an image resource and has an image relevance score that indicates a measure of relevance of the image resource to the query; identifying, from the plurality of image search results, a top ranked image search result, the top ranked image search result having an image relevance score that exceeds image relevance scores of each other image search result in the plurality of image search results; and identifying the image resource referenced by the top ranked image search result as the result image.

Identifying a result image responsive to the query may comprise: accessing a data store storing query-image pairs, each query-image pair including a paired query and a paired image; identifying a particular query-image pair that includes a paired query that corresponds to the received query; and identifying the paired image included in the particular query-image pair as the result image.

Determining that an object depicted in a sub-portion of the query image is similar to the result image may comprise: comparing visual features of the result image to visual features of the query image; determining, based on the comparison, a measure of similarity between the visual features of the result image and the visual features of an object depicted in the sub-portion of the query image; determining that the measure of similarity meets a pre-determined similarity threshold; and determining that the object depicted in the sub-portion of the query image is similar to the result image in response to determining that the measure of similarity meets the pre-determined similarity threshold.

The annotation data may specify the coordinates of a bounding box that surrounds the sub-portion of the query image that includes the object that is similar to the result image, and the annotation may comprise a visual depiction of the bounding box.

The annotation may comprise a visual highlight of the sub-portion of the query image that includes the object that is similar to the result image. The annotation may comprise at least a portion of the result image.

Particular embodiments of the subject matter described in this specification can be implemented so as to realize one or more of the following advantages. For various reasons, users may appreciate assistance in identifying objects within images or video. For example, the subject matter described herein may facilitate user identification of an object faster than the user would have otherwise been able to locate or identify the object. In addition, objects may be identified and located for a user, even if the user is unaware of what the object looks like.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An image search system facilitates identification and annotation of objects within an image. For example, if a user wishes to find a particular object within an image that includes many objects, the image search system can find the particular object in the image and cause it to be highlighted for the user. The systems and methods disclosed herein facilitate the identification and annotation of an object within an image.

An image search system receives a query and an image from a user device. For example, a user who wishes to find a particular candy bar on a grocery shelf full of different candy bars may take a picture of the shelf and submit the picture and a query specifying the particular candy bar the user is looking for to the image search system. After receiving the query and the image, the image search system identifies at least one result image that is responsive to the received query. For example, the image search system may query an image database to find an image that is highly relevant to the particular candy bar specified by the user's query. An example highly relevant result image could be, for example, an image of the particular candy bar in its distinctive wrapper.

The image search system determines whether a portion of the query image matches, or is similar to, a result image identified by the image search system. For example, the image identified as relevant to the user's query for the particular candy bar can be compared to the image provided by the user device to determine if a portion of the image provided by the user device is similar to the relevant image. In response to determining that a portion of the image is similar to the identified image, the image search system provides the user device with annotation data that causes the user device to display an annotation in the image originally submitted by the user device. The annotation specifies the portion of the image submitted by the user that is similar to the result image identified by the image search system. For example, if a portion of the picture of the grocery store shelf is similar to the image of the particular candy bar, the image search system provides the user device with instructions to highlight that portion of the image, indicating to the user that the image of the grocery store shelf includes something similar to the particular candy bar specified by the user's query.

Figure 1:
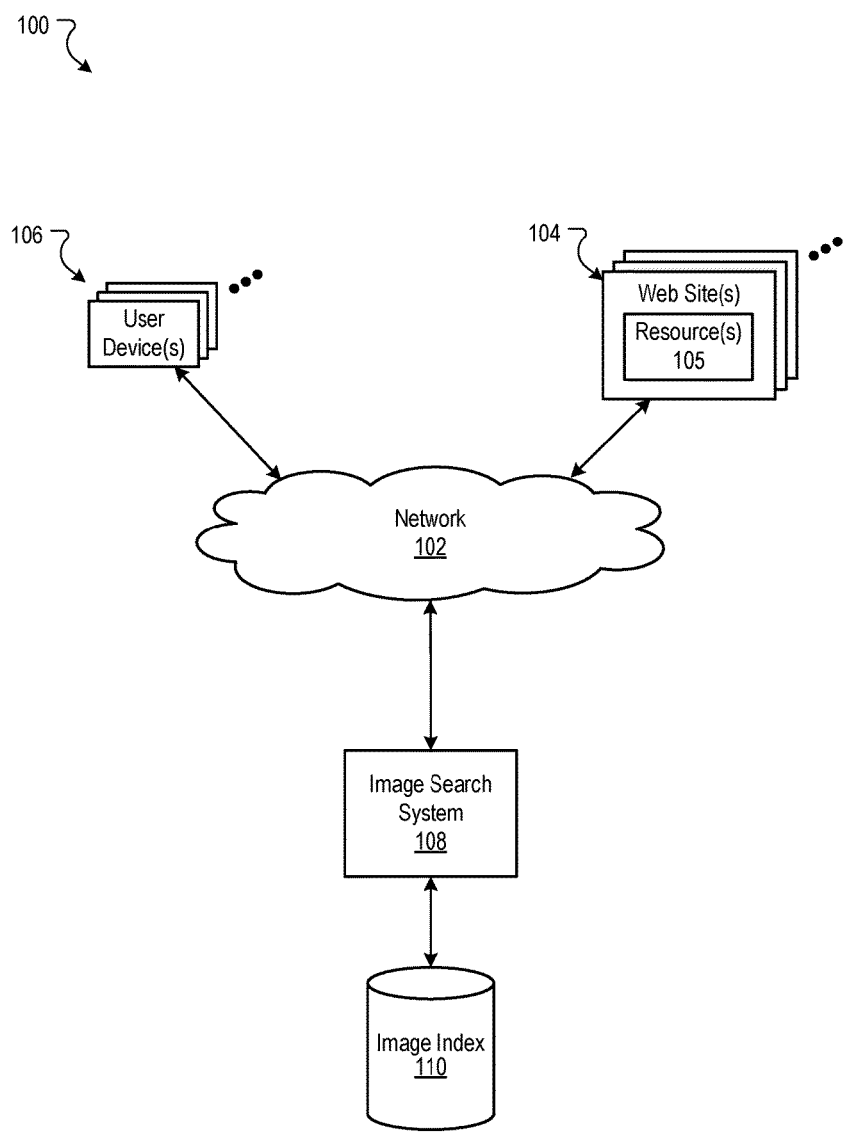
FIG. 1 is a block diagram of an example environment for searching within an image.

FIG. 1 is a block diagram of an example environment 100 for searching within an image. A computer network 102, such as a local area network (LAN), wide area network (WAN), the Internet, or a combination thereof, connects publisher web sites 104, user devices 106, and the image search system 108. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 105 is data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device capable of requesting and receiving resources and other data over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of image resources 105, the image search engine 108 identifies images by crawling the publisher web sites 104 and indexing the image resources provided by the publisher web sites 104. The indexed and, optionally, cached copies of the image resources, are stored in a data storage device, such as the image index 110.

The user devices 106 submit search queries to the image search system 108. In response to the search query, the image search system 108 uses the image index 110 to identify image resources that are relevant to the queries. The image search system 108 identifies the image resources in the form of image search results and returns the image search results to the user devices 106 in an image search results page resource. An example image search result can include a thumbnail of the image resource, a snippet of text extracted from the web page hosting the image resource, and the URL of the web page.

The image search results are ranked based on scores related to the image resources identified by the image search results, such as information retrieval ("IR") scores, and optionally a separate ranking of each image resource relative to other image resources (e.g., an authority score). The image search results may be ordered according to these scores and provided to the user device according to the order. The scores and/or rankings of image resources may also be stored in the image index 108 for various queries along with the corresponding indexed and/or cached image resources.

The image search system 108 is also capable of receiving requests to search within an image. For example, a user device 106 may submit a search query and a query image to the image search system 108. The image search system 108 uses the search query to identify an image responsive to the query, e.g., the image search system 108 may obtain the top-ranked image resource for the search query from the image index 110. The image search system 108 then determines whether a portion of the query image is similar to the image identified as responsive to the search query and, if so, provides the requesting user device with an annotation that highlights the portion of the query image that is similar to the identified image.

Figure 2:
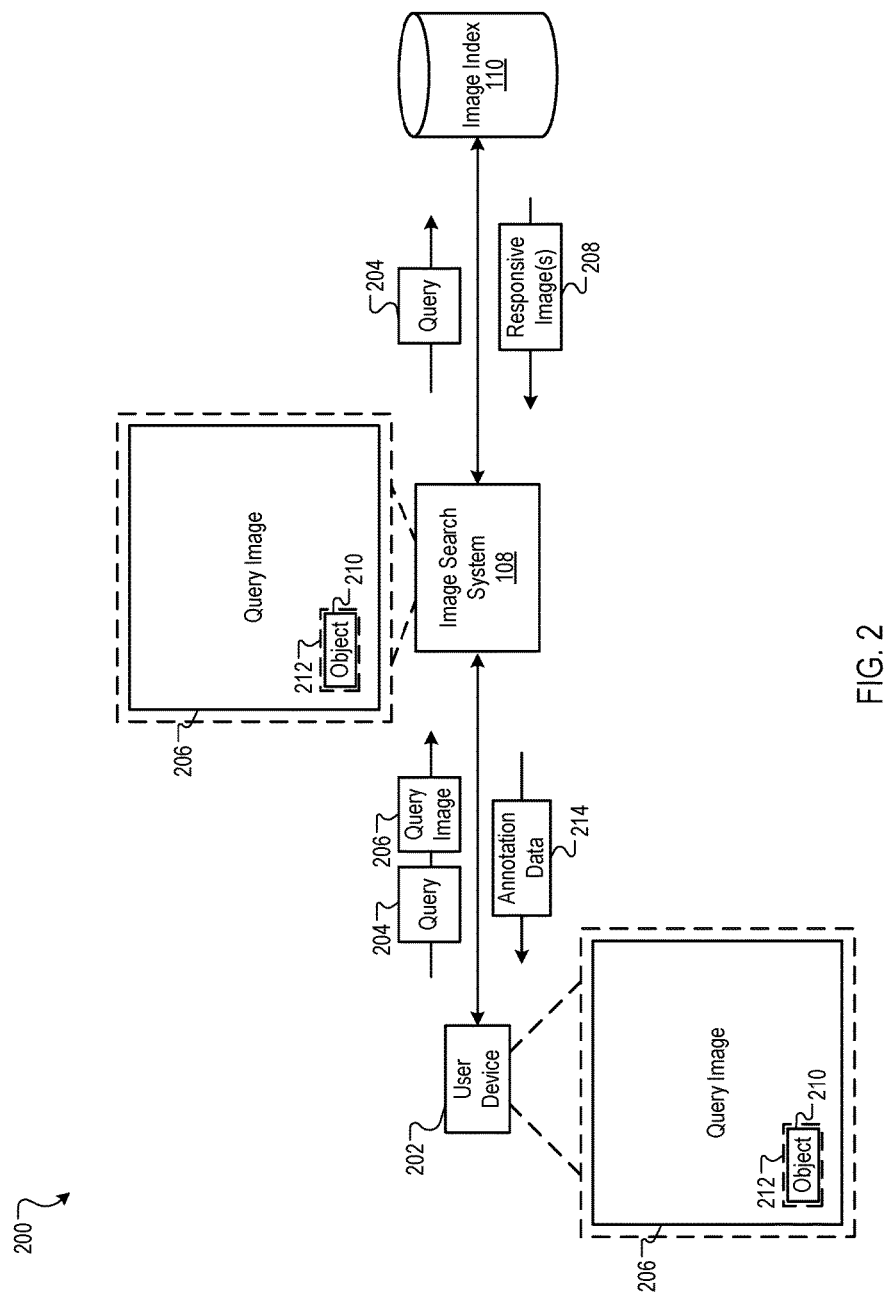
FIG. 2 is an illustration of an example process for searching within an image.

FIG. 2 is an illustration of an example process 200 for searching within an image. The user device 202 provides a query 204 and a query image 206 to the image search system 108. For example, a user may be looking for a particular candy bar in a grocery store aisle full of candy bars. Rather than searching the entire aisle for the single candy bar, a user can take a picture of the grocery store shelf that is likely to contain the candy bar of interest, and submit the picture along with a text or audio query that is, for example, the name of the candy bar.

The image search system 108 receives the query 204 and the query image 206, and identifies an image that is responsive to the query 204. The query 204 is, for example, a text query, or voice input that can be converted to text, or some other type of query that is not an image. In some implementations, the image search system obtains a result image 208 from the image index 110. For example, a user searching for a "Crunchy Delight" brand candy bar may submit a query image 206 along with the query 204, "Crunchy Delight." The image search system 108 can then retrieve the top-ranked image for the query "Crunchy Delight" from the image index 110.

In some implementations, the image search system 108 identifies image resources that are responsive to the query 204. For example, the image search system 108 may search the image index 110 using one of a variety of image search algorithms for images that are responsive to the query. Each identified image resource has an image relevance score that indicates a measure of relevance of the image resource to the query 204. The result image 208 may be the image resource with the highest relevance score for the query 204. In some implementations, multiple result images 208 can be obtained from the image index 110. For example, the image search system 108 may obtain the top three ranked images for the "Crunchy Delight" query from the image index 110. As another example, the image search system 108 may obtain images with a rank and/or IR score above a certain threshold from the image index.

In some implementations, the image search system 108 obtains a result image 208 from a particular corpus of images stored in the image index 110, or accesses a result image from data stored in the index 110 specifying a location of the result image. For example, one corpus of images stored in the image index 110 may be manually ranked and/or scored by a machine and/or users for particular queries. The manual scores and rankings may be dependent upon user input. For example, users may be asked to select an image that identifies a particular object, such as "Crunchy Delight" candy bars. Users, in turn, can rank and/or select one or more images that represent the product or query, "Crunchy Delight." Example images might include images of the "Crunchy Delight" logo, images of a wrapped "Crunchy Delight" candy bar, and images of an unwrapped candy bar. For the purpose of identifying a retail product, users may specifically be asked to identify an image that best represents "Crunchy Delight" when viewed as a retail product. One or more of these manually scored/selected images can be stored in the image index 110 and associated with the query, "Crunchy Delight," and later retrieved as result image(s) 208 responsive to the query "Crunchy Delight."

In some implementations, the image index 110 may store query-image associations in a corpus of query-image pairs. For example, the top-ranked or highest scoring image for a particular query may be paired with that query in the image index 110, such that each query in the corpus of query-image pairs has a single image associated with it. In some implementations, a query image pair may include multiple images paired with a single query. When a query 204 is received by the image search system 108, each image paired with that query may be retrieved from the image index 110 as a result image 208.

The image search system 108 determines whether an object 210 depicted in a sub-portion 212 of the query image 206 is similar to the result image 208. For example, if the result image 208 is an image of the "Crunchy Delight" logo, the image search system determines whether the query image 206 submitted by the user device 202 includes something similar to the "Crunchy Delight" logo. As used in this specification, a "sub-portion" of an image is a portion of the image that is less than the entire image. For example, if an image is 1000×1000 pixels, any portion of the image less than 1000×1000 pixels is considered a sub-portion of the image, e.g., a 100×100 portion of the image.

In some implementations, the image search system 108 determines whether an object depicted in a sub-portion of the query image 206 is similar to the result image 208 by comparing visual features of result image 208 to visual features of the query image 206. A variety of appropriate image comparison algorithms can be used to make this determination. For example, color, contrast, point, text, and/or edge detection processes may be used to identify visual features of each image, and the data obtained from these processes can be compared to determine a measure of similarity between the visual features of the result image 208 and the visual features of an object depicted in a sub-portion of the query image 206. Object recognition processes can be used to identify specific objects in the images and perform local feature analysis of the sub-portions of the image in which the specific objects are located. If a measure of similarity meets a pre-determined threshold, the image search system 108 determines that the object depicted in the sub-portion of the query image 206 is similar to the result image 208. The pre-determined threshold can be set by a system administrator or be a machine-learned threshold. If no sub-portion of the query image 206 includes an object that is similar to the result image 208, another result image may be selected for comparison.

In some implementations, result images 208 may be pre-processed, and data specifying visual features of the result images 208 may also be stored in the image index 110. This may reduce processing required by the image search system 108 to compare images. Many image comparison methods, processes, and techniques may be used to compare images. For example, optical character recognition may be used to identify text depicted in each image, so if a result image 208 includes a candy bar logo with the text, "Crunchy Delight," this text may be identified and compared to text identified in the query image 206.

As another example, the image search system 108 may compare images using feature detection and matching processes to identify similar sub-portions of an image. For example, a local feature detection process, such as scale-invariant feature transform, may be used to identify and describe features of a result image 208, and these features can be compared to features detected in the query image 206 to determine whether a similar sub-portion of the query image 206 exists. A match or similarity may be determined, for example, when a predetermined number or percentage of compared features are within a threshold measure of similarity to one another.

In response to determining that an object 210 depicted in a sub-portion 212 of the query image 206 is similar to the result image 208, the image search system 108 provides annotation data 214 to the user device 202. The annotation data 214 causes the user device to display an annotation with the query image 206, and the annotation specifies the sub-portion 212 of the query image 206 that includes the object 210 that is similar to the result image 208. For example, the if the image search system 108 determines that an object included in the image of the grocery store shelf is similar to a logo found in a result image for the query, "Crunchy Delight," the image search system will send annotation data to the user device indicating the location of the object within the search image. Example annotations are described in further detail with respect to FIG. 3.

In an alternate implementation, the search system 108 can modify the query image 206 with the annotation data and the query image 206 can be sent back to the user device as annotated by the search system 110. For example, the image search system 108 may annotate the query image 206 and provide the resulting combination of query image 206 plus annotation to the user device 202. In some implementations, the annotation data 214 does not include the query image 206, but includes instructions that cause the user device 202 to display an annotation with the query image 206.

In some implementations, multiple similar objects may be identified within a single query image 206. For example, if multiple boxes or packages of the "Crunchy Delight" candy bar are on a grocery store shelf, the image search system 108 may identify each of them. In this situation, the annotation data 214 provided to the user device may specify each sub-portion of the query image 206 that includes a similar object separately, or the annotation data may specify a single sub-portion of the query image 206 that encompasses each similar object.

In some implementations, the image search system 108 may receive multiple query images 206 or a query video. When multiple query images are received, the image search system 108 may process each of them, e.g., in the manner described above, to identify one or more of the query images that include an object similar to a result image, and provide annotation data 214 specifying the location of the objects within one or more of the images that include the similar object. If a query video is provided, multiple query images or frames may be selected from the query video for processing. For example, a user searching for "Crunchy Delight" candy bars in a grocery store may take a video of an entire grocery store aisle and submit it to the image search system 108 with the query, "Crunchy Delight." The image search system 108 can select a number of video frames to analyze and compare to a result image 208 for the query, "Crunchy Delight," and provide annotation data 214 to the user device 202 that causes the user device to display the video frame with an annotation identifying an object similar to the result image 208.

Figure 3:
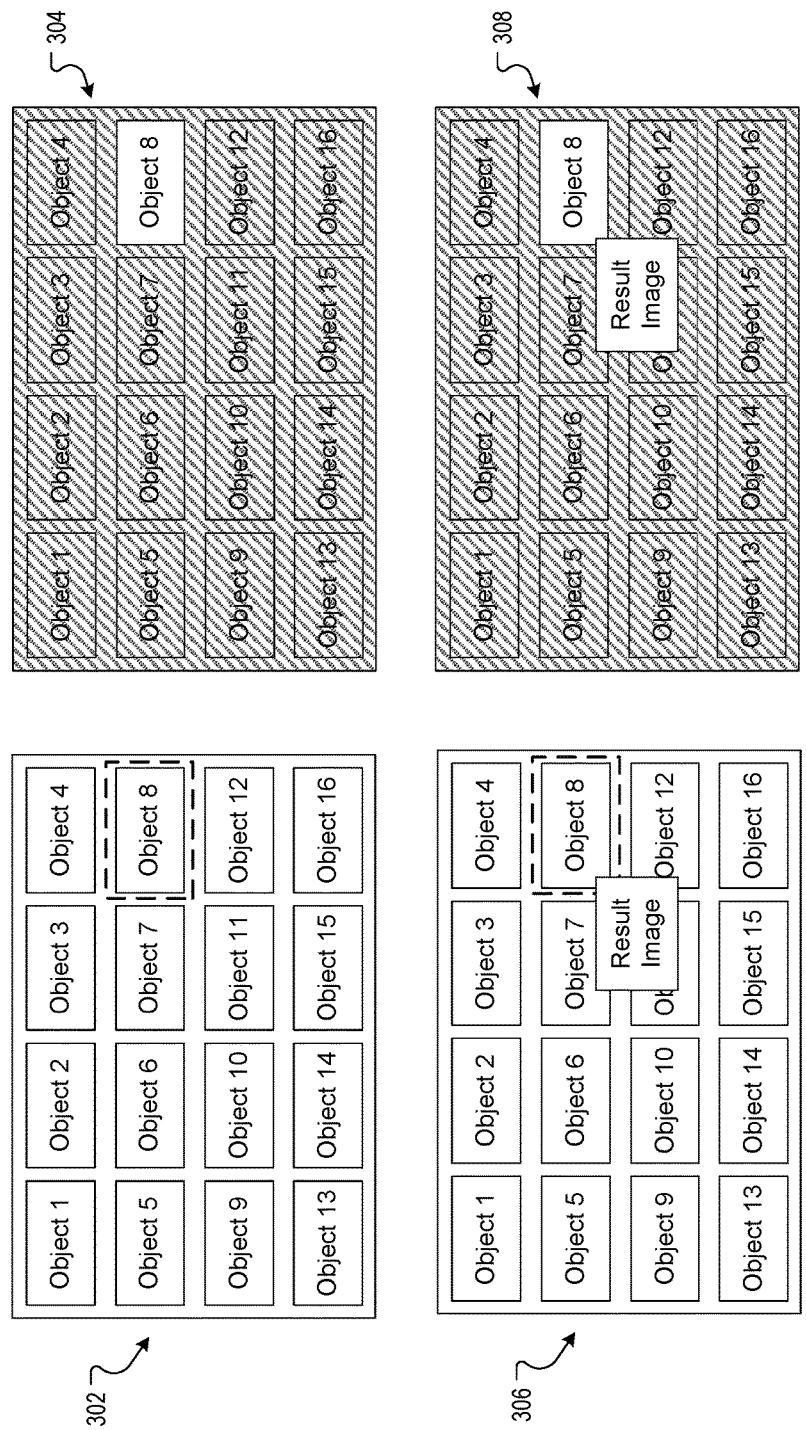
FIG. 3 is an illustration of example annotations displayed with images.

FIG. 3 is an illustration of example annotations 300 displayed with images. The example annotations 300 each depict an example method of specifying a sub-portion of a query image that includes an object that is similar to a result image. Other methods may be used, and other information may be included in the annotation and/or annotation data.

The example annotation of image 302 depicts a bounding box surrounding an object depicted in the image. In this example, the annotation data specifies the coordinates of a bounding box, e.g., x,y coordinates of four corners of a box, that surrounds the sub-portion of the query image 302 that includes an object that is identified as similar to the result image. The annotation itself is a visual depiction of a bounding box, which in this example image 302 is a box represented by a dashed line.

The example annotation of image 304 depicts visual highlighting of a sub-portion of the image 304 that includes an object determined to be similar to a result image. In this example, the annotation data causes a user device to shade the portions of the image that do not include the object, making the object stand out to a user.

The example annotation of image 306 depicts a bounding box surrounding an object depicted in the image along with a representation of the result image. In this example, the annotation data specifies the coordinates of a bounding box, e.g., x,y coordinates of four corners of a box, that surrounds the sub-portion of the query image 302 that includes an object that is identified as similar to the result image. The annotation itself is a visual depiction of a bounding box with an overlay depicting the result image. The overlay may include, for example, a thumbnail of the result image.

The example annotation of image 308 depicts visual highlighting of a sub-portion of the image 304 that includes an object determined to be similar to a result image along with a representation of the result image. In this example, the annotation data causes a user device to shade the portions of the image that do not include the object, making the object stand out to a user. The annotation also includes an overlay depicting the result image, e.g., a thumbnail of the result image.

Other methods for annotating images can be used to indicate sub-portions of query images that include objects similar to result images. For example, a colored filter may be used to highlight a sub-portion of an image. In some implementations, the annotation can include other data, such as a hyperlink to a website where information about the object may be found. For example, an annotation may include a link to the website from which the result image was obtained or a link to a website containing reviews for a product depicted in the result image.

Figure 4:
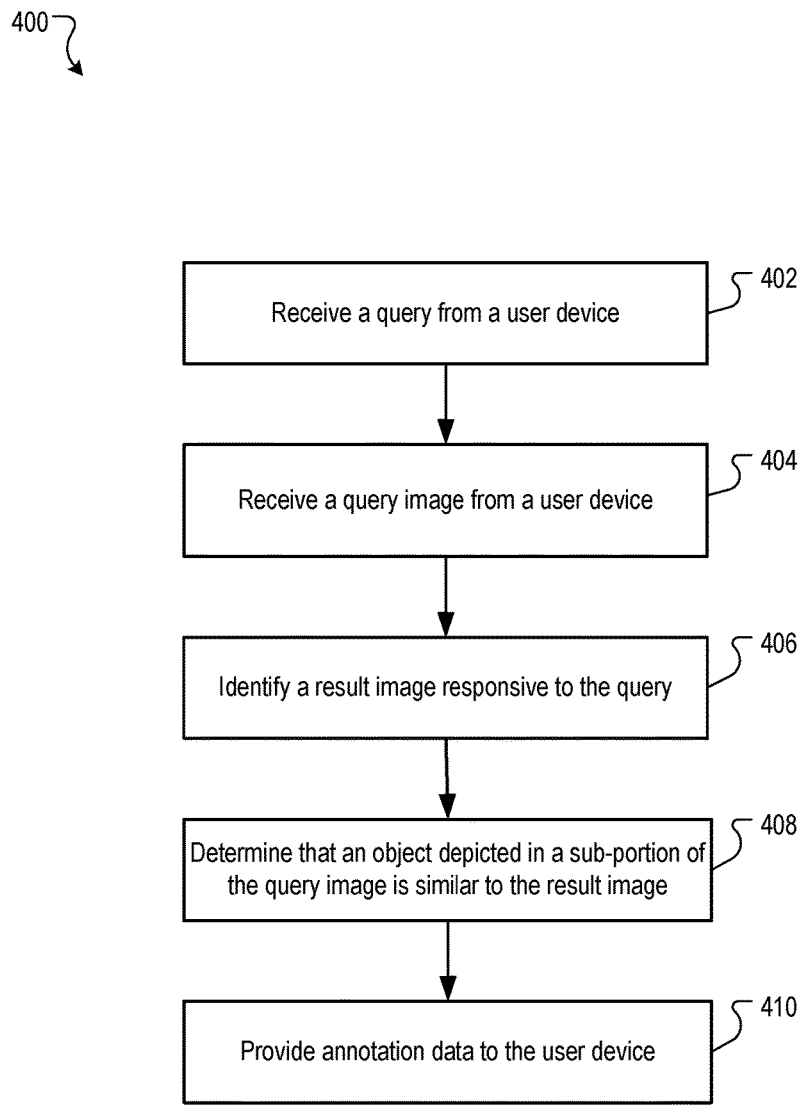
FIG. 4 is a flow diagram of an example process for searching within an image.

FIG. 4 is a flow diagram of an example process 400 for searching within an image. The example process 400 may be implemented by a data processing apparatus, such as the image search system described above.

A query is received from a user device (402). For example, a user searching for a widget on a shelf of hardware at a hardware store might use a smartphone to submit the query, "widget," to an image search system.

A query image is received from a user device (404). For example, the user searching for the widget in the hardware store might take a picture of the shelf of hardware with a smartphone and submit the picture to the image search system with the query, "widget."

A result image that is responsive to the query is identified (406). In some implementations, identifying a result image responsive to the query includes accessing a data store that stores query-image pairs, where each query-image pair includes a query and an image. A particular query-image pair is identified that includes a paired query that corresponds to the received query, and the paired image included in the particular query-image pair is identified as the result image. A paired query corresponds to the received query when, for example, the received query and the paired query match, or when an expanded version of the received query (e.g., an alternate spelling or similar query) matches the paired query or an expanded version of the paired query. For example, an image index may contain an image associated with the query, "widget." The result image may have been previously identified as an image that represents the query, "widget," by other users or by a computer, e.g., using a voting, scoring, and/or ranking method. That result image is identified as the result image for the received query, "widget." Other image search processing algorithms can also be used.

In some implementations, identifying a result image responsive to the query includes identifying image search results that are responsive to the query. Each image search result references an image resource and has an image relevance score that indicates a measure of relevance of the image resource to the query. From the image search results, a top ranked image search result is identified. The top ranked image search result is the image search result with the highest relevance score with respect to the other identified image search results. The image resource referenced by the top ranked search result is identified as the result image.

The process 400 determines that an object depicted in a sub-portion of the query image is similar to the result image (408). In some implementations, determining that an object depicted in a sub-portion of the query image is similar to the result image includes comparing visual features of the result image to visual features of the query image. Based on the comparison, a measure of similarity may be determined between the visual features of the result image and the visual features of an object depicted in the sub-portion of the query image. The measure of similarity may be, for example, a number on a scale from 0.0 to 1.0, where 0.0 indicates no similarity, and 1.0 indicates an identical match. In some implementations, the measure of similarity may be compared to a threshold to determine whether the measure of similarity meets a pre-determined similarity threshold. In response to determining that the measure of similarity meets the pre-determined threshold, the object depicted in the query image may be identified as similar to the result image.

In response to determining that an object depicted in a sub-portion of the query image is similar to the result image, annotation data is provided to the user device (410). The annotation data causes the user device to display an annotation with the query image. The annotation specifies the sub-portion of the query image that includes the object that is similar to the result image. For example, when the image search system determines that an object in the picture of the hardware store shelf is similar to the result image for the query, "widget," annotation data is provided to the smartphone that submitted the query and query image. The annotation data may, for example, cause an application on the smartphone to draw a box around the object in the query image. In situations where multiple widgets are identified in the query image, the annotation data may cause the smartphone to draw multiple boxes—one for each widget.

Figure 5:
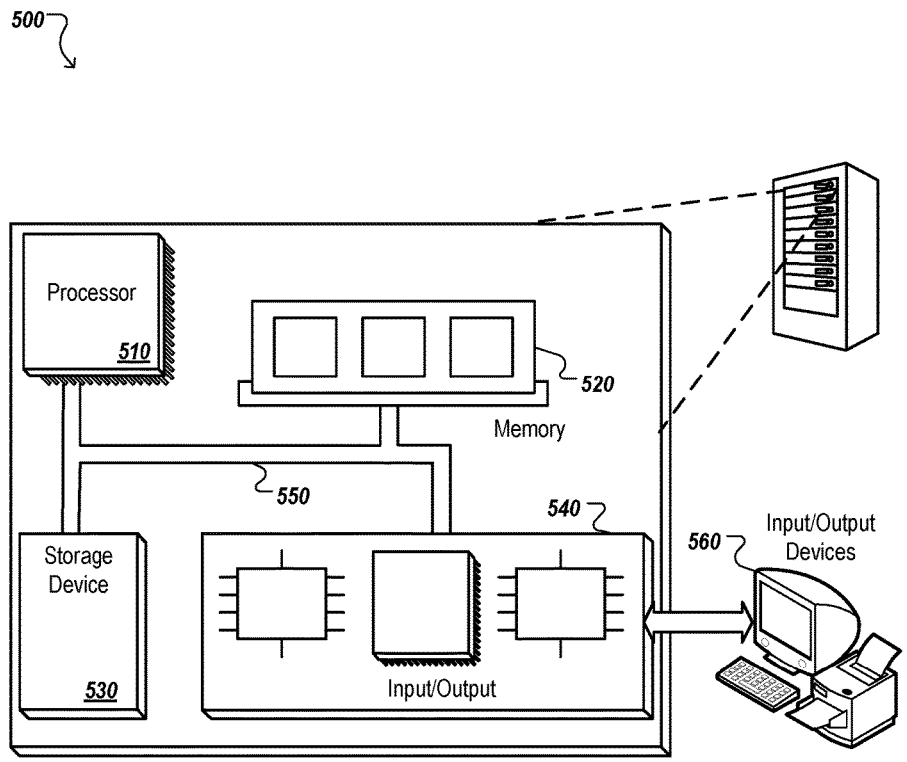
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   receiving a first image;
   receiving a first query that is not an image and that is associated with the first image and separate from the first image;
   identifying a set of second images responsive to the first query and that do not include the first image, each second image in the set of second images being different from the first image;
   in response to identifying the set of second images responsive to the first query:
      comparing visual features of each second image of the set of second images to visual features of the first image; and
      determining that a candidate object depicted in one or more of the second images of the set of second images is similar to a particular object depicted in a sub-portion of the first image; and
   in response to determining that the candidate object depicted in the one or more of the second images of the set of second images is similar to the particular object depicted in the sub-portion of the first image:
      providing an annotation that causes a user device to display an annotation with the first image, the annotation providing information about the particular object depicted in the sub-portion of the first image, the annotation indicating that the first image includes the particular object that is relevant to the first query.

2. The method of claim 1, wherein the annotation specifies the sub-portion of the query image that includes the object that is similar to the result image.

3. The method of claim 2, wherein the annotation is a bounding box that surrounds the sub-portion of the query image that includes the object.

4. The method of claim 1, wherein the annotation is a link to a website that provides information about the object.

5. The method of claim 1, wherein the annotation is a link to a website from which a result image was obtained.

6. The method of claim 1, wherein the first query is text data.

7. The method of claim 1, wherein identifying a set of second images that do not include the first image comprises:
- identifying a plurality of image search results responsive to the first query, wherein each image search result references an image resource and has an image relevance score that indicates a measure of relevance of the image resource to the first query;
- identifying, from the plurality of image search results, a set of top ranked image search result, each top ranked image search result having an image relevance score that exceeds image relevance scores of each other image search result in the plurality of image search results that are not in the set of top ranked image search results; and
- identifying the image resources referenced by the set of top ranked image search results as the set of second images.

8. The method of claim 1, wherein identifying a set of second images that do not include the first image comprises:
- accessing a data store storing query-image pairs, each query-image pair including a paired query and a paired image;
- identifying a particular query-image pair that includes a paired query that corresponds to the first query; and
- identifying the paired image included in the particular query-image pair an image that belongs to the set of second images.

9. A system comprising:
a data processing apparatus; and
a data store storing instructions that, when executed by the data processing apparatus, cause the data processing apparatus to perform operations comprising:
receiving a first image;
receiving a first query that is not an image and that is associated with the first image and separate from the first image;
identifying a set of second images responsive to the first query and that do not include the first image, each second image in the set of second images being different from the first image;
in response to identifying the set of second images responsive to the first query:
- comparing visual features of each second image of the set of second images to visual features of the first image; and
- determining that a candidate object depicted in one or more of the second images of the set of second images is similar to a particular object depicted in a sub-potion of the first image; and
in response to determining that the candidate object depicted in the one or more of the second images of the set of second images is similar to the particular object depicted in the sub-portion of the first image:
- providing annotation that causes a user device to display an annotation with the first image, the annotation providing information about the particular object depicted in the sub-portion of the first image, the annotation indicating that the first image includes the particular object that is relevant to the first query.

10. The system of claim 9, wherein the annotation specifies the sub-portion of the query image that includes the object that is similar to the result image.

11. The system of claim 10, wherein the annotation is a bounding box that surrounds the sub-portion of the query image that includes the object.

12. The system of claim 9, wherein the annotation is a link to a website that provides information about the object.

13. The system of claim 9, wherein the annotation is a link to a website from which a result image was obtained.

14. The system of claim 9, wherein the first query is text data.

15. The system of claim 9, wherein identifying a set of second images that do not include the first image comprises:
- identifying a plurality of image search results responsive to the first query, wherein each image search result references an image resource and has an image relevance score that indicates a measure of relevance of the image resource to the first query;
- identifying, from the plurality of image search results, a set of top ranked image search result, each top ranked image search result having an image relevance score that exceeds image relevance scores of each other image search result in the plurality of image search results that are not in the set of top ranked image search results; and
- identifying the image resources referenced by the set of top ranked image search results as the set of second images.

16. The system of claim 9, wherein identifying a set of second images that do not include the first image comprises:
accessing a data store storing query-image pairs, each query-image pair including a paired query and a paired image;
identifying a particular query-image pair that includes a paired query that corresponds to the first query; and
identifying the paired image included in the particular query-image pair an image that belongs to the set of second images.

17. A non-transitory computer readable storage medium storing instructions that, when executed by a data processing apparatus, cause the data processing apparatus to perform operations comprising:
receiving a first image;
receiving a first query that is not an image and that is associated with the first image and separate from the first image;
identifying a set of second images responsive to the first query and that do not include the first image, each second image in the set of second images being different from the first image;
in response to identifying the set of second images responsive to the first query:
- comparing visual features of each second image of the set of second images to visual features of the first image; and
- determining that a candidate object depicted in one or more of the second images of the set of second images is similar to a particular object depicted in a sub-portion of the first image; and
in response to determining that the candidate object depicted in the one or more of the second images of the set of second images is similar to the particular object depicted in the sub-portion of the first image:

providing an annotation that causes a user device to display an annotation with the first image, the annotation providing information about the particular object depicted in the sub-portion of the first image, the annotation indicating that the first image includes the particular object that is relevant to the first query.

18. The non-transitory computer readable storage medium of claim 17, wherein the annotation specifies the sub-portion of the query image that includes the object that is similar to the result image.

19. The non-transitory computer readable storage medium of claim 17, wherein the annotation is a bounding box that surrounds the sub-portion of the query image that includes the object.

20. The non-transitory computer readable storage medium of claim 17, wherein the annotation is a link to a website that provides information about the object.

* * * * *

UNITED STATES PATENT AND TRADEMARK OFFICE
CERTIFICATE OF CORRECTION

Page 1 of 1

PATENT NO. : 10,210,181 B2
APPLICATION NO. : 15/195667
DATED : February 19, 2019
INVENTOR(S) : George L. Nachman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this
Twenty-ninth Day of October, 2019

Andrei Iancu
*Director of the United States Patent and Trademark Office*